(12) United States Patent
Liao et al.

(10) Patent No.: US 10,777,121 B1
(45) Date of Patent: Sep. 15, 2020

(54) POWER CIRCUIT, GATE DRIVER AND RELATED OPERATION CONTROL METHOD FOR MULTI-SOURCE DISPLAY SYSTEM

(71) Applicant: HIMAX TECHNOLOGIES LIMITED, Tainan (TW)

(72) Inventors: Chi-Hung Liao, Tainan (TW);
Chang-Lung Wu, Tainan (TW);
Jen-Chun Peng, Tainan (TW);
Huan-Sen Liao, Tainan (TW);
Kuo-Tung Hsu, Tainan (TW); Wei-Jen Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/690,147

(22) Filed: Nov. 21, 2019

(51) Int. Cl.
*G09G 3/22* (2006.01)
*H02M 3/156* (2006.01)

(52) U.S. Cl.
CPC ............. *G09G 3/22* (2013.01); *H02M 3/156* (2013.01); *G09G 2330/021* (2013.01); *G09G 2330/04* (2013.01); *G09G 2330/12* (2013.01)

(58) Field of Classification Search
CPC ............. G09G 3/22; G09G 2330/12; G09G 2330/021; G09G 2330/04; H02M 3/156
See application file for complete search history.

(56) References Cited

U.S. PATENT DOCUMENTS

| 2005/0030306 | A1* | 2/2005 | Lan | G09G 5/363 345/211 |
| 2013/0043851 | A1* | 2/2013 | Ishino | H02M 3/156 323/282 |
| 2015/0069988 | A1* | 3/2015 | Miura | H02M 3/156 323/282 |
| 2017/0179823 | A1* | 6/2017 | Dash | G01R 19/175 |
| 2017/0302166 | A1* | 10/2017 | Chen | H02M 3/158 |
| 2019/0312505 | A1* | 10/2019 | Li | H02M 3/156 |

* cited by examiner

*Primary Examiner* — Andrew Sasinowski
(74) *Attorney, Agent, or Firm* — Winston Hsu (57) ABSTRACT

The present invention provides a protection circuit and related operation control method to enable the PFM circuit when the operating duration of the PFM circuit is not greater than a first threshold, and disables the PFM circuit when a rest duration of the PFM circuit is not greater than a second threshold. The present invention further provides a protection circuit and related operation control method to avoid starting excessive vertical scanning operations within one frame scanning period by masking one of the gate scanning start signal STV, the gate clock signal CKV and the gate discharge signal OEV. The present invention further provides a protection circuit and related operation control method to disable the gate scanning start signal STV when the number of clock cycles is not equal to a target number of clock cycles, which protects the gate driver from overload.

12 Claims, 13 Drawing Sheets

FIG. 14

POWER CIRCUIT, GATE DRIVER AND RELATED OPERATION CONTROL METHOD FOR MULTI-SOURCE DISPLAY SYSTEM

BACKGROUND OF THE INVENTION

1. Field of the Invention

The present invention relates to a power circuit, a gate driver and related operation control method for a multi-source display system.

2. Description of the Prior Art

More and more vehicles are equipped with automotive displays (which may be realized by control panels or rearview mirrors) to provide vehicle information and entertainment programs. For example, the automotive display may provide vehicle information, car reversing live view, or video/audio/gaming programs based on input signals. Therefore, there is a need to switch multiple input signals before one of them is inputted to the automotive display.

Figure 1:
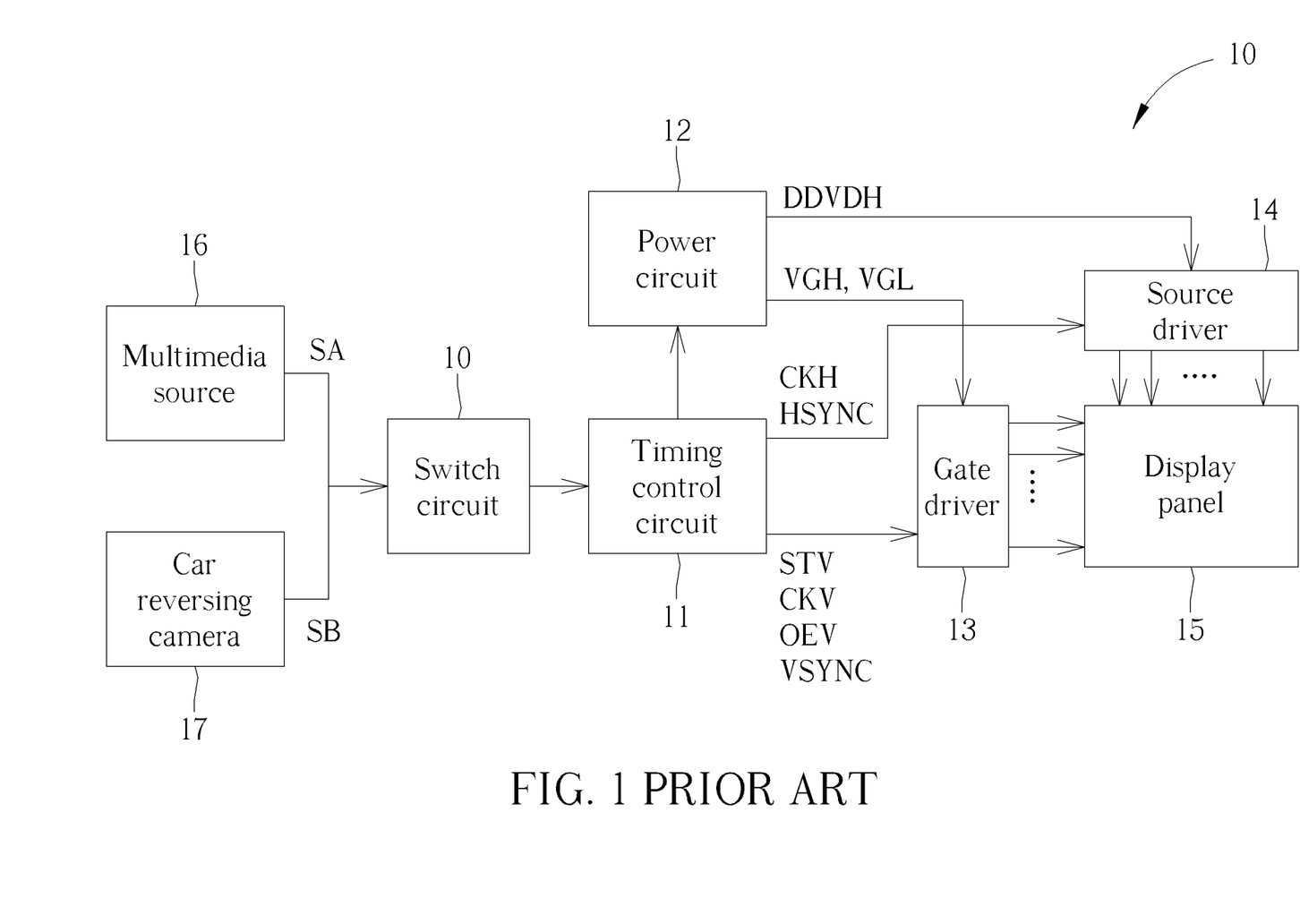
FIG. 1 is a functional block diagram of a multi-source display system of the prior art.

FIG. 1 is a functional block diagram of a multi-source display system 1 of the prior art. The multi-source display system 1 may be a control panel or a rearview mirror of a vehicle to receive either a first display signal SA from a multimedia source 16 or a second display signal SB from a car reversing camera 17 under the control of a switch circuit 10. A timing control circuit 11 is configured to generate a plurality of gate control signals STV, CKV, OEV and VSYNC to a gate driver 13, and generate a plurality of source control signals CKH and HSYNC to a source driver 14 according to either the first display signal SA or the second display signal SB. A power circuit 12 is configured to generate gate powers VGH and VGL to the gate driver 13, and generate a source power DDVDH to the source driver 14.

Applicant notices that the first display signal SA and the second display signal SB are interfered with a noise signal during the switch operation of the switch circuit 10, which causes (1) the timing control circuit 11 to generate the wrong control signals and (2) the power circuit 12 to be damaged due to the wrong control signals. In detail, a frequency of the first display signal SA and the second display signal SB is typically 60 Hz, and a frequency of the noise signal may be up to 200 KHz. The gate control signal STV is a gate scanning start signal, wherein a pulse of the gate scanning start signal STV indicates a start timing of vertical scanning line (row) of a frame. When a number of the pulse of the gate scanning start signal STV increases in one frame scanning period due to the noise signal, the gate driver 13 will start excessive vertical scanning operations within one frame scanning period. As a result, the gate driver 13 is overloaded and an overcurrent may be generated to damage the gate driver 13.

Figure 2:
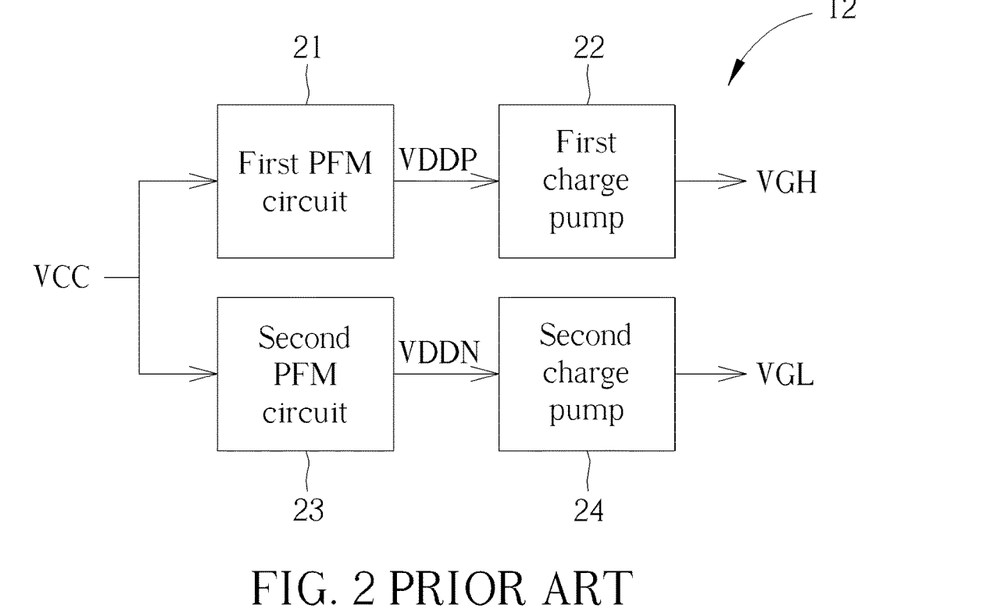
FIG. 2 is a functional block diagram of a power circuit of the prior art.

FIG. 2 is functional block diagram of the power circuit 12 of the prior art. A first PFM (Pulse frequency modulation) circuit 21 is configured to convert a system power VCC into a first intermediate voltage VDDP, and a first charge pump 22 is configured to convert the first intermediate voltage VDDP into the gate power VGH. A second PFM circuit 23 is configured to convert the system power VCC into a second intermediate voltage VDDN, and a second charge pump 24 is configured to convert the second intermediate voltage VDDN into the gate power VGL. Ideally, there is only one gate line (row) of a display panel to be turned on by the gate power VGH or VGL; however, when the number of the pulse of the gate scanning start signal STV increases in one frame scanning period due to the noise signal, a current of the gate power VGH or VGL leaks to excessive gate lines to decrease a voltage level of the gate power VGH and VGL. Therefore, the first and second charge pump 22 and 24 cannot stop working due to the current leakage of the gate power VGH and VGL, which leads to overload, heat rising and damage to the power circuit 12.

Therefore, protecting the gate driver 13 and the power circuit 12 from the high-frequency noise signal during input source switch operation has become a topic in the industry.

SUMMARY OF THE INVENTION

It is therefore an objective of the present invention to provide a protection circuit and related operation control method for a multi-source display system from starting excessive vertical scanning operations within one frame scanning period.

The present invention discloses a power circuit for a display system includes a first PFM (pulse frequency modulation) circuit, configured to convert a system power into a first intermediate voltage; a first charge pump coupled to the first PFM circuit, and configured to convert the first intermediate voltage into a first gate power; a second PFM circuit, configured to convert the system power into a second intermediate voltage; a second charge pump, coupled to the second PFM circuit, and configured to convert the second intermediate voltage into a second gate power; and a protection circuit, coupled to the first PFM circuit, the first charge pump, the second PFM circuit, and the second charge pump, and configured to enable the first PFM circuit and the second PFM circuit when an operating duration of the first PFM circuit and the second PFM circuit is not greater than a first threshold, and disables the first PFM circuit and the second PFM circuit when a rest duration of the first PFM circuit and the second PFM circuit is not greater than a second threshold.

The present invention further discloses an operation control method for a protection circuit configured to protect a power circuit of a display system, wherein the power circuit comprises a PFM (pulse frequency modulation) circuit, a charge pump and the protection circuit. The operation control method includes enabling the PFM circuit; accumulating an operating duration of the PFM circuit when the PFM circuit enabled; determining whether the operating duration of the PFM circuit is greater than a first threshold when a gate power generated by the charge pump is not satisfied; disabling the PFM circuit when the operating duration of the PFM circuit is greater than the first threshold; accumulating a rest duration of the PFM circuit when the PFM circuit is disabled; and enabling the PFM circuit when the rest duration of the PFM circuit is greater than a second threshold.

The present invention further discloses an operation control method for a protection circuit configured to protect a gate driver of a display system. The operation control method includes detecting a pulse of a gate scanning start signal indicating a start timing of a vertical scanning operation of a frame; masking the gate control signal and accumulating a mask duration of the gate control signal when a first pulse of the gate control signal has been detected; and clearing the mask duration and detecting the pulse of the gate control signal when the mask duration is greater than a threshold.

The present invention further discloses a gate driver for a display system includes an input buffer, configured to receive a gate scanning start signal, a shift clock signal, a plurality of gate mode signals indicating a number of gate lines of a display panel of the display system; a bi-directional shift register coupled to the input buffer; a level shifter coupled to the bi-directional shift register; an output buffer coupled to the level shifter, and configured to generate a plurality of gate turn-on signals the display panel according to the gate scanning start signal, the shift clock signal, and the plurality of mode signals; and a protection circuit coupled to the bi-directional shift register and the level shifter, and configured to disable the gate scanning start signal when a number of clock cycles of the shift clock signal is less than a target number after a first pulse of the gate scanning start signal has been detected, and enable the gate scanning start signal when the number of clock cycles of the shift clock signal is equal to the target number after the first pulse of the gate scanning start signal has been detected.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
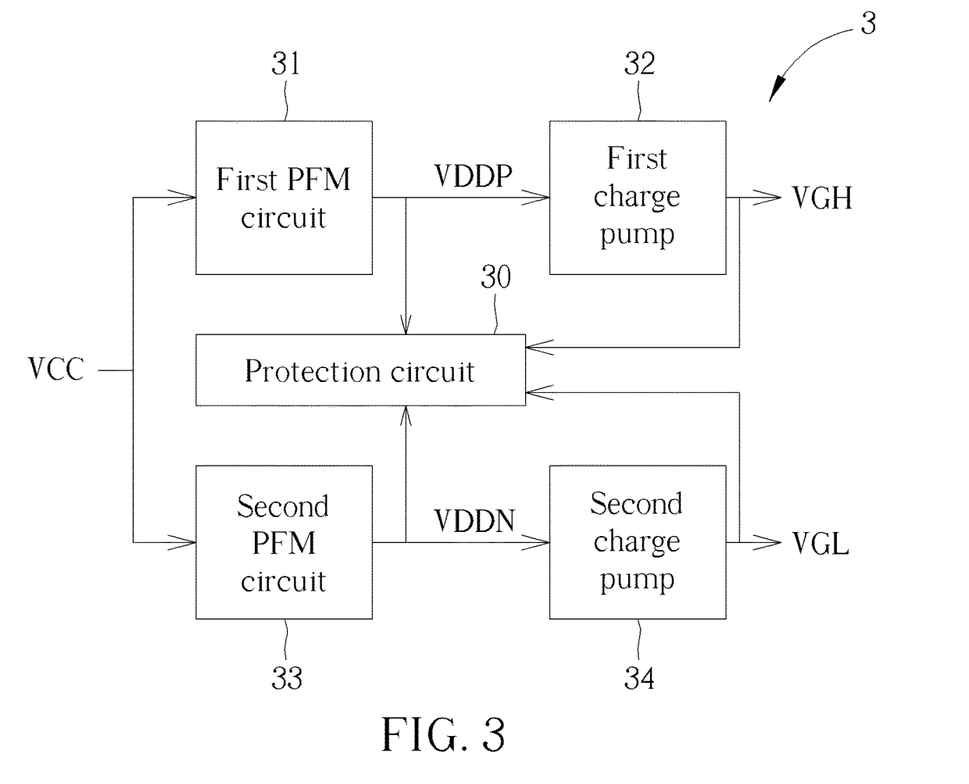
FIG. 3 is a functional block diagram of a power circuit according to an embodiment of the present invention.

FIG. 3 is a functional block diagram of a power circuit 3 according to an embodiment of the present invention. The power circuit 3 may be utilized in a multi-source display system, and include a protection circuit 30, a first PFM (Pulse frequency modulation) circuit 31, a first charge pump 32, a second PFM circuit 33, and a second charge pump 34.

The first PFM circuit 31 is coupled to the first charge pump 32 and the protection circuit 30, and configured to convert a system power VCC (typically 2.7 to 3.6V) into a first intermediate voltage VDDP, and the first charge pump 32 is configured to convert the first intermediate voltage VDDP into a first gate power VGH. The second PFM circuit 33 is coupled to the second charge pump 34 and the protection circuit 30, and configured to convert the system power VCC into a second intermediate voltage VDDN, and the second charge pump 34 is configured to convert the second intermediate voltage VDDN into a second gate power VGL.

The protection circuit 30 is coupled to the first PFM circuit 31 and the first charge pump 32, and configured to enable or disable the first PFM circuit 31 according to a first operating duration of the first PFM circuit 31, the first intermediate voltage VDDP, and the first gate power VGH. The protection circuit 30 is coupled to the second PFM circuit 33 and the second charge pump 34, and configured to enable or disable the second PFM circuit 33 according to a second operating duration of the second PFM circuit 33, the second intermediate voltage VDDN, and the second gate power VGL.

Figure 4:
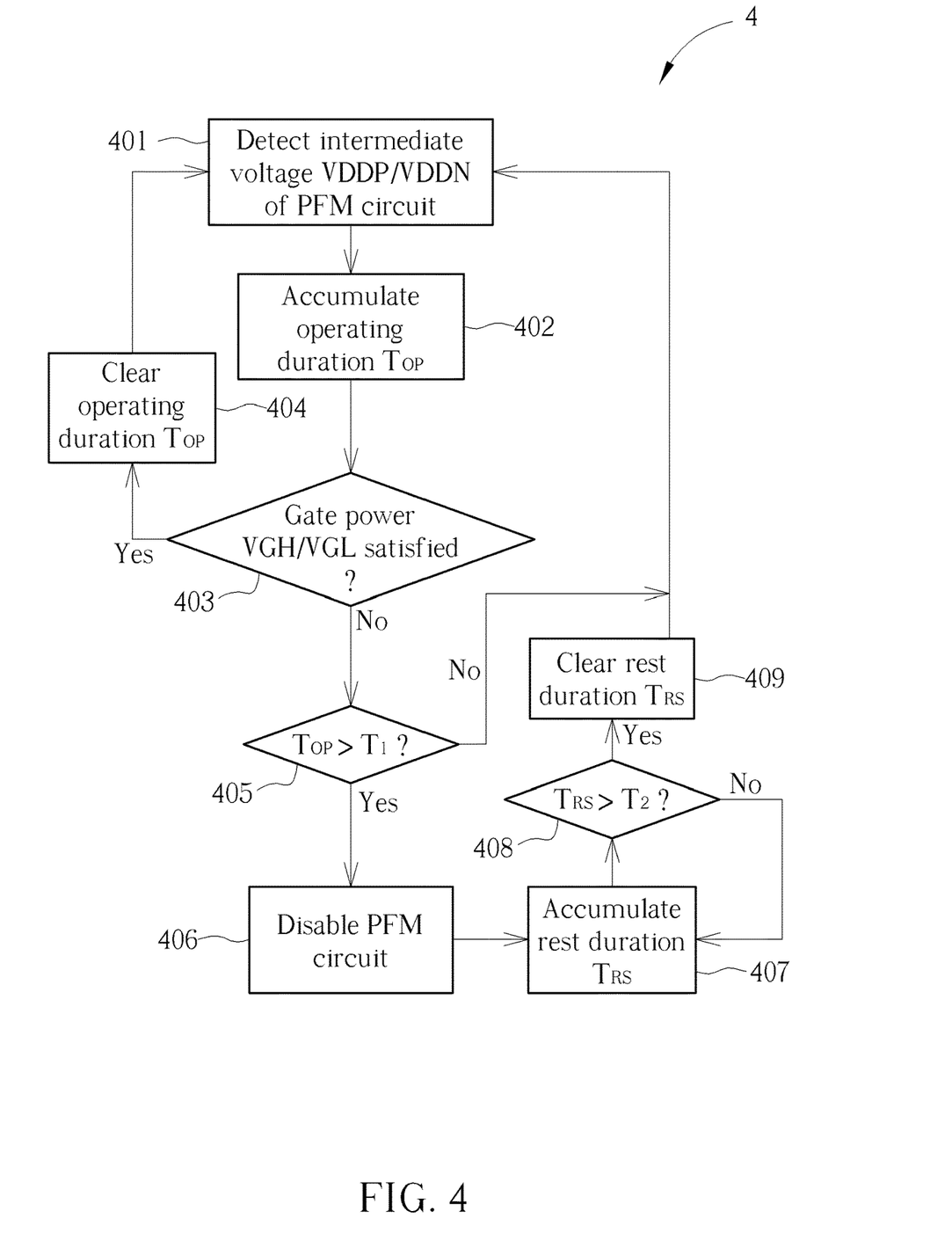
FIG. 4 is a flowchart of an operation control process according to an embodiment of the present invention.

Specifically, FIG. 4 is a flowchart of an operation control process 4 according to an embodiment of the present invention. The operation control process 4 may be performed by the protection circuit 30, and includes the following steps.

Step 401: Detect an intermediate voltage VDDP/VDDN generated by the PFM circuit.

Step 402: Accumulate an operating duration $T_{OP}$ of the PFM circuit when the PFM circuit enabled.

Step 403: Determine whether a gate power VGH/VGL generated by a charge pump satisfied? Go to Step 404 if yes; go to Step 405 if no.

Step 404: Clear the operating duration $T_{OP}$ of the PFM circuit. Return to Step 401.

Step 405: Determine whether the operating duration of the PFM circuit is greater than a first threshold ($T_{OP}>T_1$)? Go to Step 406 if yes; go to Step 401 if no.

Step 406: Disable the PFM circuit.

Step 407: Accumulate a rest duration $T_{RS}$ of the PFM circuit when the PFM circuit is disabled.

Step 408: Determine whether the rest duration of the PFM circuit is greater than a second threshold ($T_{RS}>T_2$)? Go to Step 409 if yes; go to Step 407 if no.

Step 409: Clear the rest duration $T_{RS}$ of the PFM circuit. Return to Step 401.

Take the protection circuit 30 controlling the first PFM circuit 31 for example, in Step 401, the protection circuit 30 detects the intermediate voltage VDDP generated by the first PFM circuit 31 to make sure that the first PFM circuit 31 is enabled; in one embodiment, the protection circuit 30 detects any voltage that is internally generated from the first PFM circuit 31. In Step 402, the protection circuit 30 accumulates the operating duration $T_{OP}$ of the first PFM circuit 31 when the first PFM circuit 31 is enabled. In Step 403, the protection circuit 30 detects whether the first gate power VGH is satisfied (e.g., the first gate power VGH has met a predetermined voltage) to determine whether an operating cycle of the power circuit 3 has been completed. In Step 404, the protection circuit 30 clears the operating duration $T_{OP}$ when the first gate power VGH is satisfied, and then the protection circuit 30 detects the intermediate voltage VDDP again for the next operating cycle of the power circuit 3. In Step 405, the protection circuit 30 determines whether the operating duration $T_{OP}$ of the first PFM circuit 31 is greater than the first threshold ($T_{OP}>T_1$) when the first gate power VGH is not satisfied. In Step 406, the protection circuit 30 disables the first PFM circuit 31 when the operating duration $T_{OP}$ of the first PFM circuit 31 is greater than the first threshold ($T_{OP} > T_1$), i.e., the first PFM circuit 31 is overloaded for a predetermined time. In Step 407, the protection circuit 30 accumulates the rest duration $T_{RS}$ of the first PFM circuit 31 when the first PFM circuit 31 is disabled. In Step 408, the protection circuit 30 determines whether the rest duration of the first PFM circuit 31 is greater than the second threshold ($T_{RS} > T_2$). In Step 409, the protection circuit 30 clears the rest duration $T_{RS}$ of the first PFM circuit 31 and then enables the first PFM circuit 31 for the next operating cycle of the power circuit 3 when the rest duration of the first PFM circuit 31 is greater than the second threshold.

In other words, the protection circuit 30 enables the first PFM circuit 31 (and the second PFM circuit 33) when the operating duration $T_{OP}$ is not greater than the first threshold $T_1$, and disables the first PFM circuit 31 (and the second PFM circuit 33) when the rest duration $T_{RS}$ is not greater than the second threshold $T_2$. By properly setting the first threshold $T_1$ and the second threshold $T_2$, the first PFM circuit 31 (and the second PFM circuit 33) may operate regularly without the influence from the noise signal during the switch operation of a switch circuit of a multi-source display system.

Figure 5:
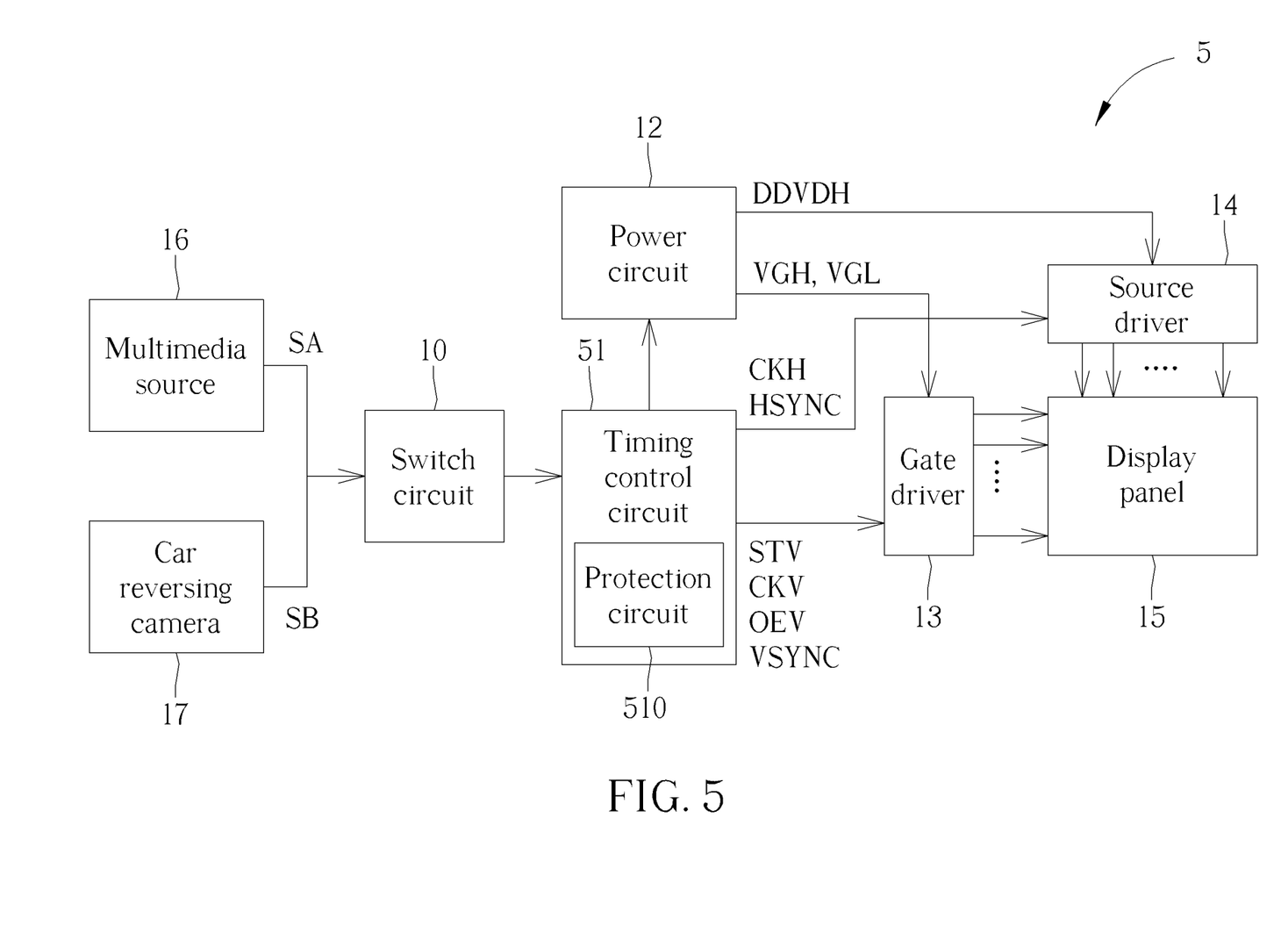
FIG. 5 is a functional block diagram of a multi-source display system 5 according to an embodiment of the present invention.

FIG. 5 is a functional block diagram of a multi-source display system 5 according to an embodiment of the present invention. The multi-source display system 5 may be a control panel or a rearview mirror of a vehicle to receive either a first display signal SA from a multimedia source 16 or a second display signal SB from a car reversing camera 17 under the control of a switch circuit 10. A timing control circuit 51 is configured to generate a plurality of gate control signals STV, CKV, OEV and VSYNC to a gate driver 13 and a plurality of source control signals CKH and HSYNC to a source driver 14 according to either the first display signal SA or the second display signal SB. A power circuit 12 is configured to generate gate powers VGH and VGL to the gate driver 13, and generate a source power DDVDH to the source driver 14. The timing control circuit 51 includes a protection circuit 501 configured to process at least one of the gate control signals STV, CKV and OEV before they are inputted to the gate driver 13.

Figure 6:
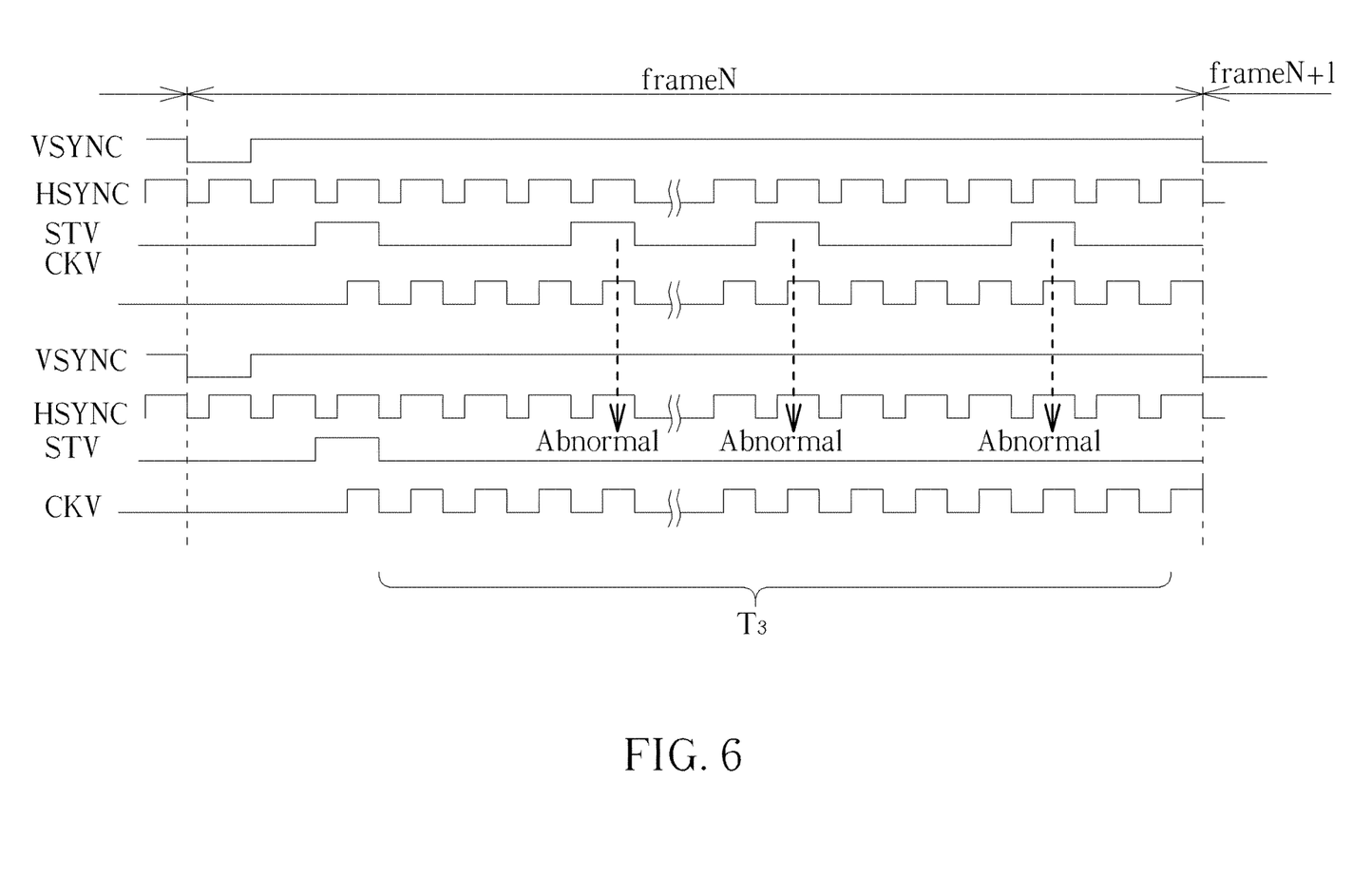
FIG. 6 is a signal diagram of the control signals STV, CKV, VSYNC and HSYNC according to an embodiment of the present invention.

FIG. 6 is a signal diagram of the control signals STV, CKV, VSYNC and HSYNC according to an embodiment of the present invention. The protection circuit 501 masks any pulse of the gate scanning start signal STV for a predetermine duration T3 (e.g., one frame scanning period) once a first pulse of the gate scanning start signal STV has been detected. Therefore, there is no vertical scanning operation to be started within the predetermine duration T3, which protects the gate driver 13 from overload.

Figure 7:
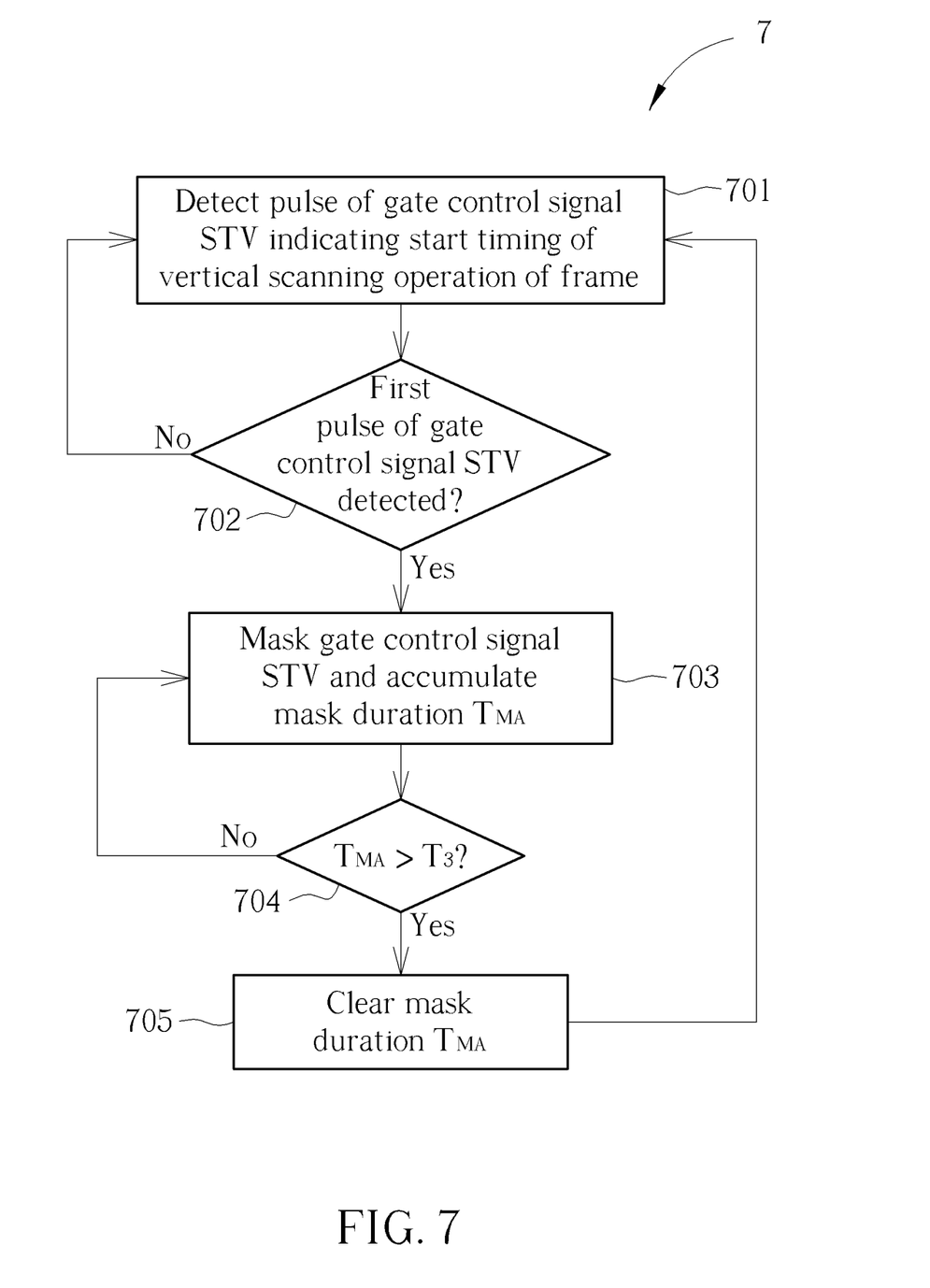
FIG. 7 is a flowchart of an operation control process according to an embodiment of the present invention.

Specifically, FIG. 7 is a flowchart of an operation control process 7 according to an embodiment of the present invention. The operation control process 7 may be performed by the protection circuit 501, and includes the following steps.

Step 701: Detect a pulse of a gate scanning start signal STV indicating a start timing of vertical scanning operation of a frame.

Step 702: Determine whether a first pulse of the gate scanning start signal STV has been detected? Go to Step 703 if yes; return to Step 701 if no.

Step 703: Mask the gate scanning start signal STV and accumulate a mask duration $T_{MA}$ of the gate scanning start signal STV.

Step 704: Determine whether the mask duration $T_{MA}$ is greater than a third threshold $T_3$? Go to Step 705 if yes; return to Step 703 if no.

Step 705: Clear the mask duration $T_{MA}$. Return to Step 701.

In Step 701, the protection circuit 501 detects the pulse of the gate scanning start signal STV indicating the start timing of vertical scanning operation of one frame. In Steps 702 to 703, the protection circuit 501 masks the gate scanning start signal STV and accumulates the mask duration $T_{MA}$ of the gate scanning start signal STV when the first pulse of the gate scanning start signal STV has been detected. In Steps 704 to 705, the protection circuit 501 clears the mask duration $T_{MA}$ when the mask duration $T_{MA}$ is greater than the third threshold $T_3$ ($T_{MA} > T_3$). In one embodiment, the protection circuit 501 sets the gate scanning start signal STV to a logic zero state during the third threshold $T_3$, which is not limited. Therefore, the protection circuit 501 masks the pulse of the gate scanning start signal STV after the first pulse of the gate scanning start signal STV has been detected for the third threshold $T_3$. By properly setting the third threshold $T_3$, the gate driver 13 may not start excessive vertical scanning operations within one frame scanning period due to the noise signal during the switch operation of the switch circuit 10 of the multi-source display system 5.

Figure 8:
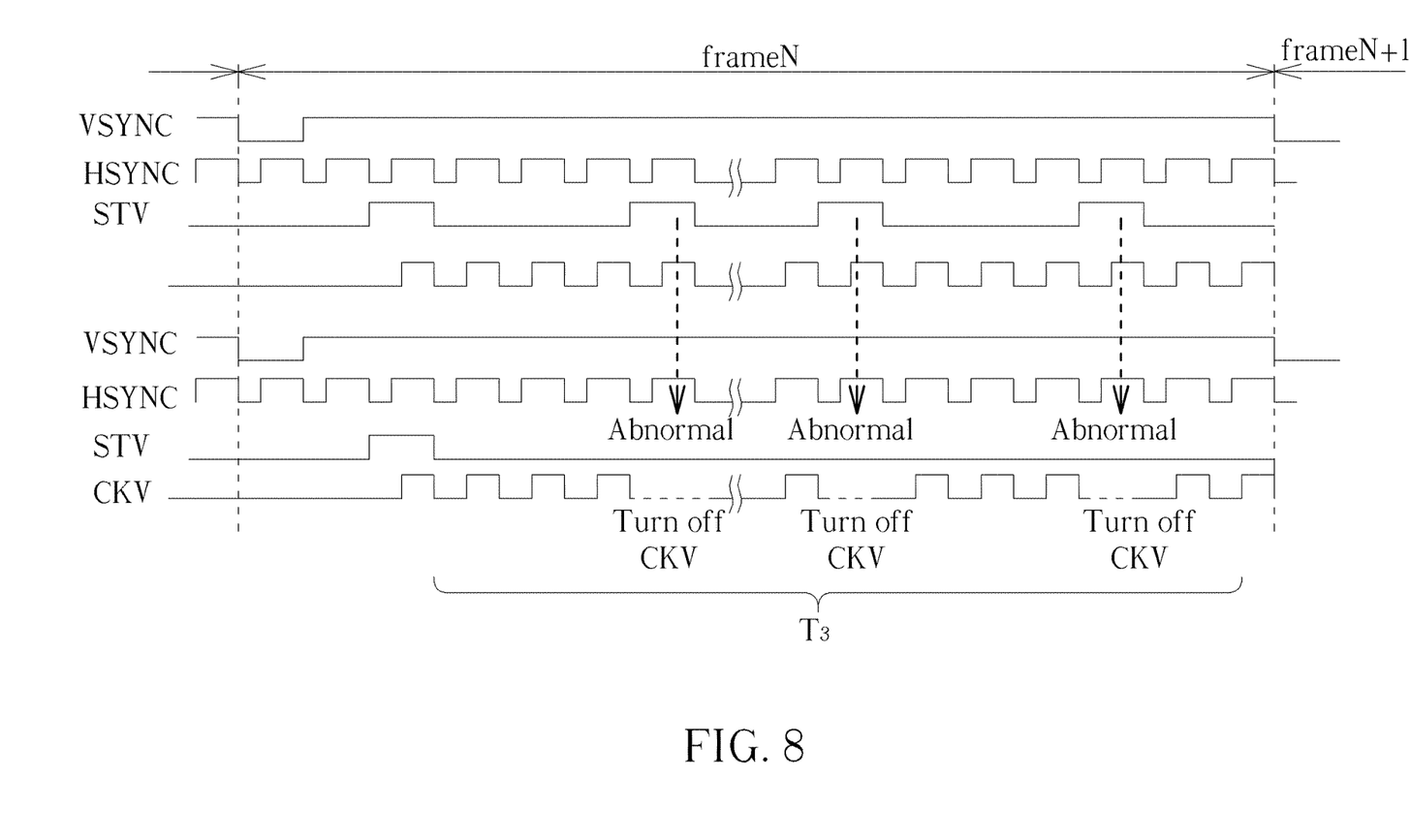
FIG. 8 is a signal diagram of the control signals STV, CKV, VSYNC and HSYNC according to an embodiment of the present invention.

FIG. 8 is a signal diagram of the control signals STV, CKV, VSYNC and HSYNC according to an embodiment of the present invention. The protection circuit 501 turns off the control signal CKV when an abnormal or irregular pulse of the gate scanning start signal STV is detected for a predetermine duration T3 (e.g., one frame scanning period). The control signal CKV is a vertical scanning line clock, the gate driver 13 turns on a vertical scanning line when a rising edge of the control signal CKV is detected. Therefore, the gate driver 13 is unable to turn on any vertical scanning line when the control signal CKV is turned off (or set to a logic state) within the predetermine duration T3, which protects the gate driver 13 from overload.

Figure 9:
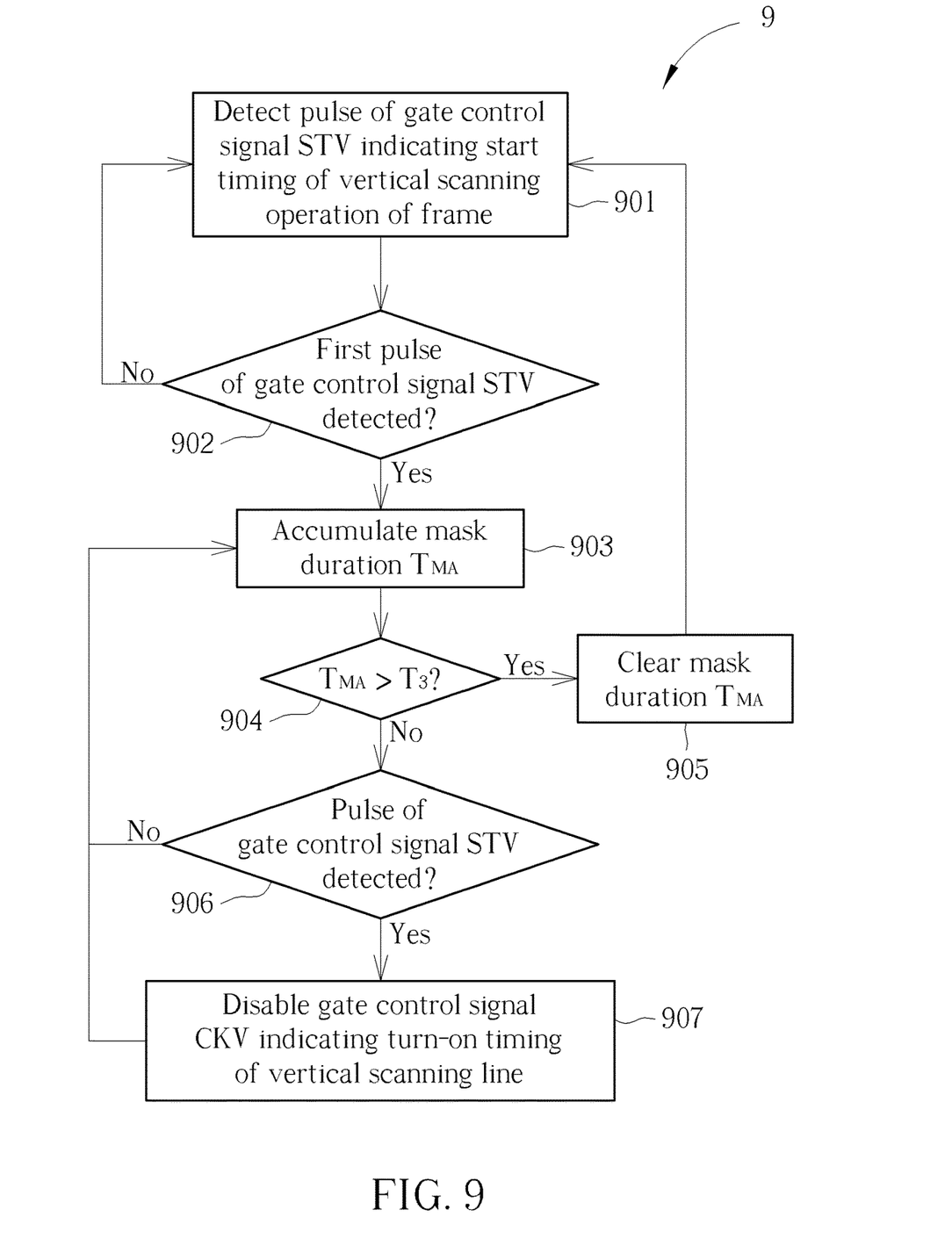
FIG. 9 is a flowchart of an operation control process according to an embodiment of the present invention.

Specifically, FIG. 9 is a flowchart of an operation control process 9 according to an embodiment of the present invention. The operation control process 9 may be performed by the protection circuit 501, and includes the following steps.

Step 901: Detect a pulse of a gate scanning start signal STV indicating a start timing of vertical scanning operation of a frame.

Step 902: Determine whether a first pulse of the gate scanning start signal STV has been detected? Go to Step 903 if yes; return to Step 901 if no.

Step 903: Accumulate a mask duration $T_{MA}$ of the gate scanning start signal STV.

Step 904: Determine whether the mask duration $T_{MA}$ is greater than a third threshold $T_3$? Go to Step 905 if yes; go to Step 906 if no.

Step 905: Clear the mask duration $T_{MA}$. Return to Step 901.

Step 906: Determine whether another pulse of the gate scanning start signal STV is detected? Go to Step 907 if yes; return to Step 903 if no.

Step 907: Disable agate control signal CKV indicating a turn-on timing of a vertical scanning line. Return to Step 903.

In Step 901, the protection circuit 501 detects the pulse of the gate scanning start signal STV indicating the start timing of vertical scanning operation of one frame. In Steps 902 to 903, the protection circuit 501 accumulates the mask duration TA of the gate scanning start signal STV when the first pulse of the gate scanning start signal STV has been detected. In Steps 904 to 905, the protection circuit 501 clears the mask duration TA when the mask duration $T_{MA}$ is greater than the third threshold $T_3$ ($T_{MA}>T_3$). In Steps 904 to 906, the protection circuit 501 determines whether a pulse of the gate scanning start signal STV is detected when the mask duration $T_{MA}$ is not greater than the third threshold $T_3$ ($T_{MA}<=T_3$). In Steps 906 to 907, the protection circuit 501 disables a gate control signal CKV indicating a turn-on timing of a vertical scanning line when another pulse of the gate scanning start signal STV is detected during the third threshold $T_3$. Therefore, the gate driver 13 is unable to start excessive vertical scanning operations within one frame scanning period when the control signal CKV is turned off (or set to a logic state) within the predetermine duration $T_3$, which protects the gate driver 13 from overload.

Figure 10:
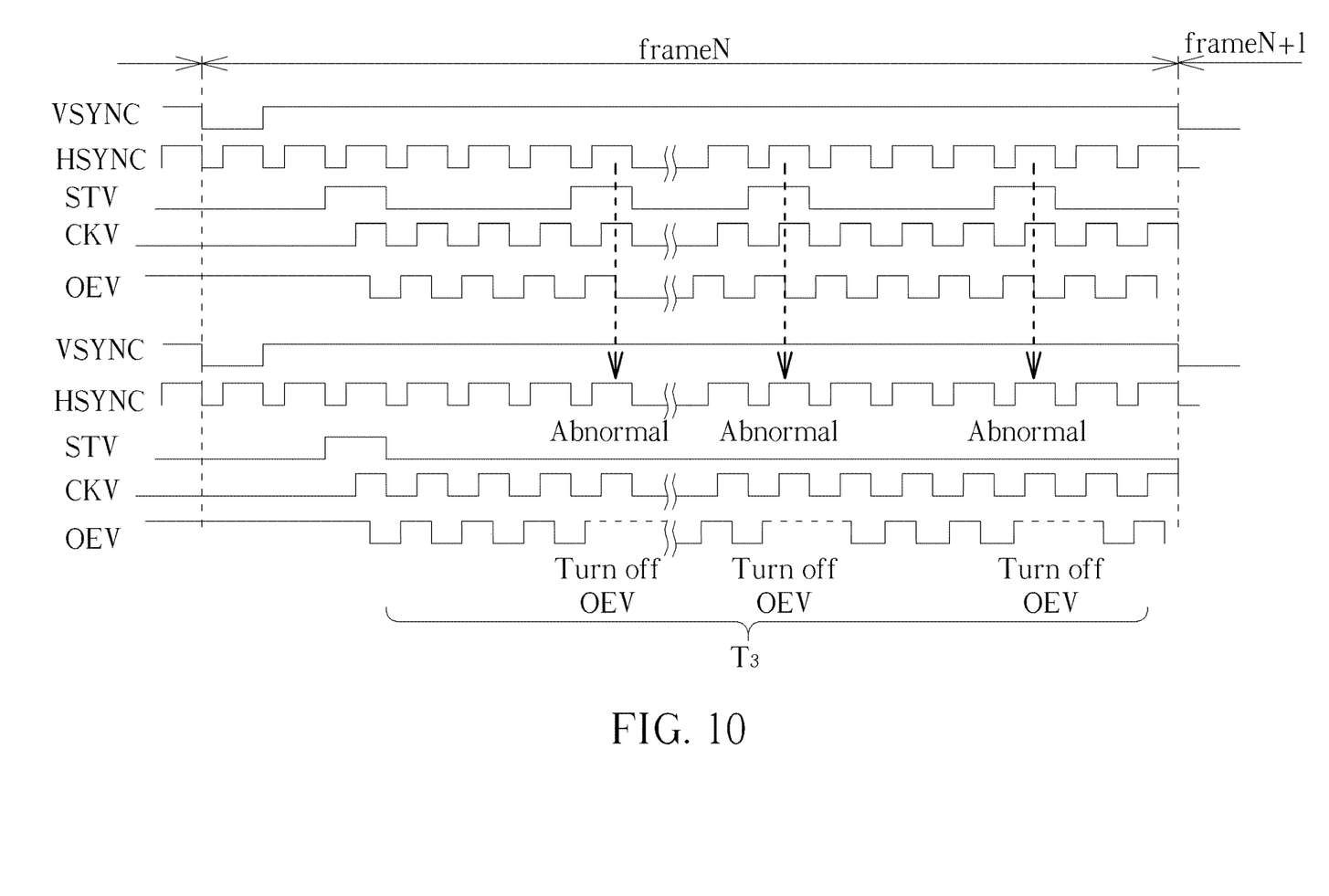
FIG. 10 is a signal diagram of the control signals STV, CKV, OEV, VSYNC and HSYNC according to an embodiment of the present invention.

FIG. 10 is a signal diagram of the control signals STV, CKV, OEV, VSYNC and HSYNC according to an embodiment of the present invention. The protection circuit 501 turns off the control signal OEV when an abnormal or irregular pulse of the gate scanning start signal STV is detected for a predetermine duration T3 (e.g., one frame scanning period). The gate control signal OEV is used to discharge vertical scanning lines, and it is asserted during transition of two successive scanning lines. The gate driver 13 discharges a vertical scanning line when a logic zero state of the control signal OEV is detected. Therefore, the gate driver 13 is unable to discharge any vertical scanning line when the control signal OEV is turned off (or set to a logic one state) within the predetermine duration T3, which protects the power circuit 12 from overload due to large discharge current.

Figure 11:
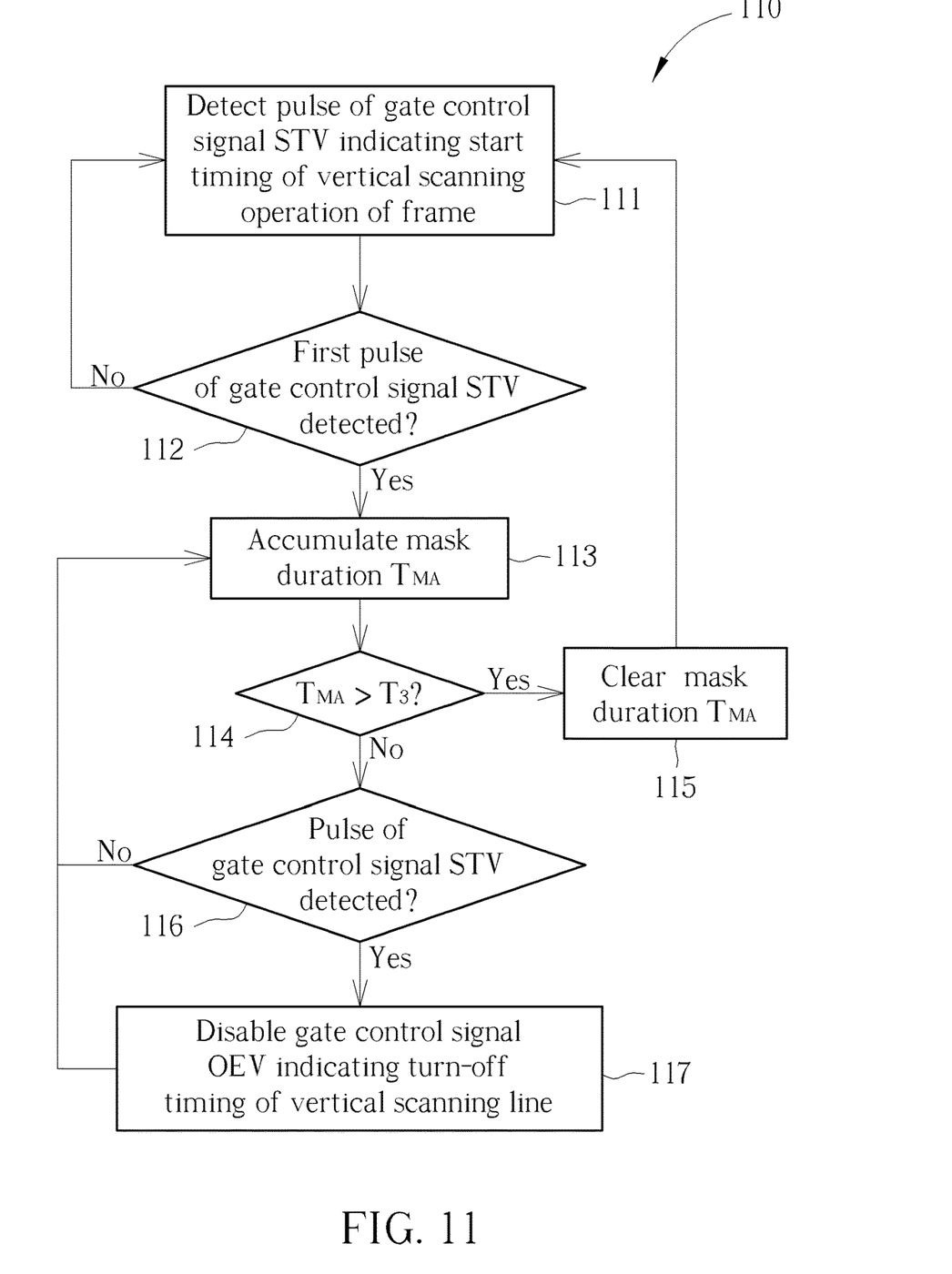
FIG. 11 is a flowchart of an operation control process according to an embodiment of the present invention.

Specifically, FIG. 11 is a flowchart of an operation control process 110 according to an embodiment of the present invention. The operation control process 110 may be performed by the protection circuit 501, and includes the following steps.

Step 111: Detect a pulse of a gate scanning start signal STV indicating a start timing of vertical scanning operation of a frame.

Step 112: Determine whether a first pulse of the gate scanning start signal STV has been detected? Go to Step 113 if yes; return to Step 111 if no.

Step 113: Accumulate a mask duration $T_{MA}$ of the gate scanning start signal STV.

Step 114: Determine whether the mask duration $T_{MA}$ is greater than a third threshold $T_3$? Go to Step 115 if yes; go to Step 116 if no.

Step 115: Clear the mask duration $T_{MA}$. Return to Step 111.

Step 116: Determine whether a pulse of the gate scanning start signal STV is detected? Go to Step 117 if yes; return to Step 113 if no.

Step 117: Disable a gate control signal OEV indicating a discharge timing of a vertical scanning line. Return to Step 113.

In Step 111, the protection circuit 501 detects the pulse of the gate scanning start signal STV indicating the start timing of vertical scanning operation of one frame. In Steps 112 to 113, the protection circuit 501 accumulates the mask duration T of the gate scanning start signal STV when the first pulse of the gate scanning start signal STV has been detected. In Steps 114 to 115, the protection circuit 501 clears the mask duration T when the mask duration $T_{MA}$ is greater than the third threshold $T_3$ ($T_{MA}>T_3$). In Steps 114 to 116, the protection circuit 501 determines whether a pulse of the gate scanning start signal STV is detected when the mask duration $T_{MA}$ is not greater than the third threshold $T_3$ ($T_{MA}<=T_3$). In Steps 116 to 117, the protection circuit 501 disables a gate control signal OEV indicating a discharge timing of a vertical scanning line when a pulse of the gate scanning start signal STV is detected during the third threshold $T_3$. Therefore, the gate driver 13 is unable to discharge excessive vertical scanning line when the control signal OEV is turned off (or set to a logic one state) within the predetermine duration $T_3$, which protects the power circuit 12 from overload due to large discharge current.

Figure 12:
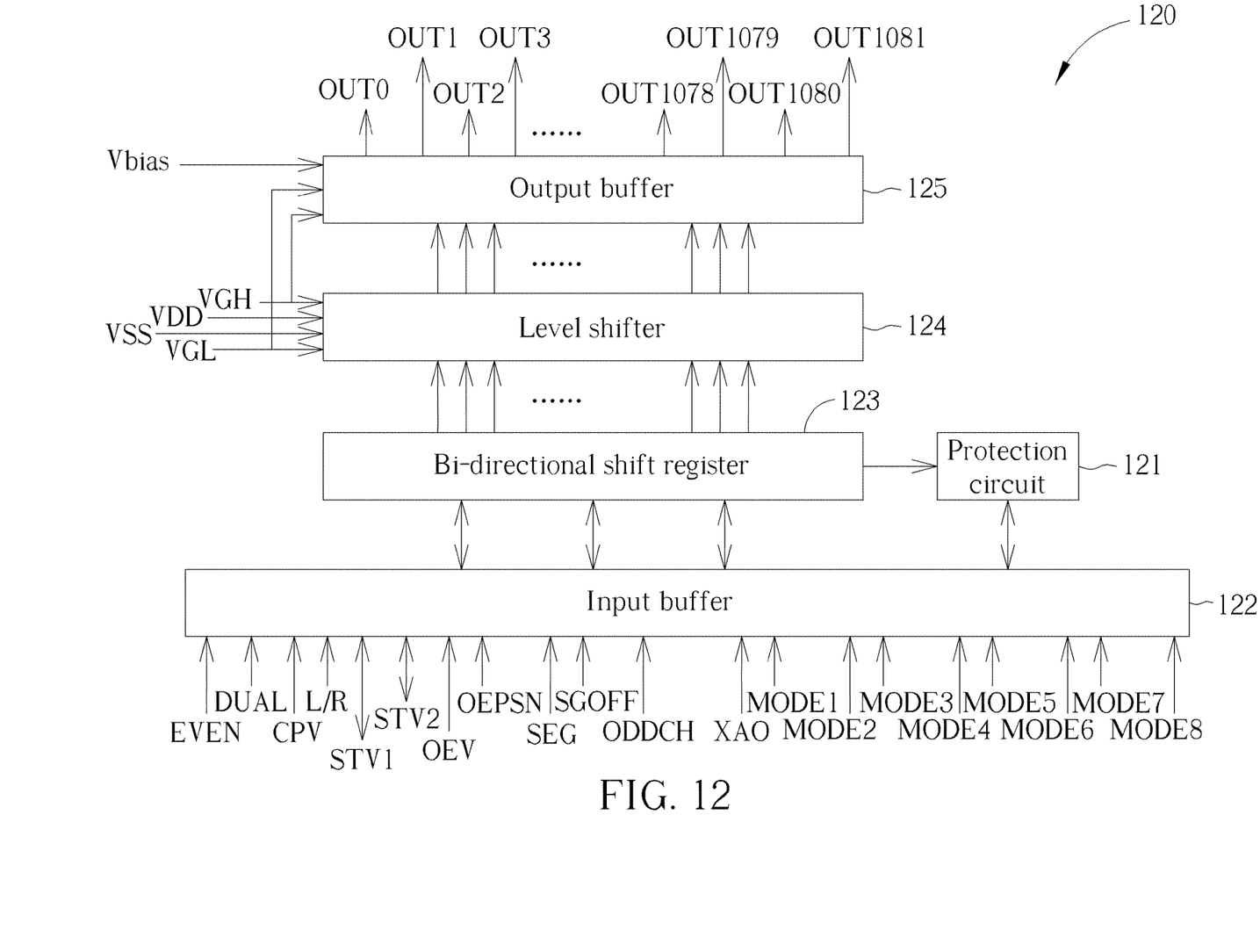
FIG. 12 is a functional block diagram of a gate driver according to an embodiment of the present invention.

FIG. 12 is a functional block diagram of a gate driver 120 according to an embodiment of the present invention. The gate driver 120 may be utilized in the multi-source display system 5 of FIG. 5, and include a protection circuit 121, an input buffer 122, a bi-directional shift register 123, a level shifter 124, and an output buffer 125.

The input buffer 122 is configured to receive a plurality of gate control signals EVEN, DUAL, CPV, L/R, STV1, STV2, OEV, OEPSN, SEG, SGOFF, ODDCH, and gate mode signals MODE1 to MODE8. The level shifter 124 and the output buffer 125 are powered by power signals Vbias, VGH, VDD, VSS, VGL generated by the power circuit 12 of the multi-source display system 5. The output buffer 125 is configured to regularly output a plurality of gate turn-on signals OUT0 to OUT1081 to the display panel 15 to turn on gate lines of the display panel 15 one by one.

The protection circuit 121 is coupled to the input buffer 122 and the bi-directional shift register 123, and configured to detect a first pulse of the gate scanning start signal STV1 (or STV2) and count a number of clock cycles $N_{CK}$ of the gate control signal CPV to determine whether to disable the gate scanning start signal STV1 (or STV2). Note that the gate control signal CPV is a shift clock for the bi-directional shift register 123. After the first pulse of the gate scanning start signal STV1 (or STV2) has been detected, the protection circuit 121 disables the gate scanning start signal STV1 (or STV2) when the number of clock cycles of the gate control signal CPV is less than a target number $N_{TA}$ (e.g., a number of total gate lines of a display panel) ($N_{CK}<N_{TA}$). When the number of clock cycles of the gate control signal CPV is equal to the target number $N_{TA}$ ($N_{CK}=N_{TA}$), which means a vertical scanning operation of a frame has been completed, the protection circuit 121 enables the gate scanning start signal STV2 (or STV1) for the next vertical scanning operation of a new frame. Note that the gate mode signals MODE1 to MODE8 indicate the number of total gate lines of the display panel (i.e., the target number $N_{TA}$).

Figure 13:
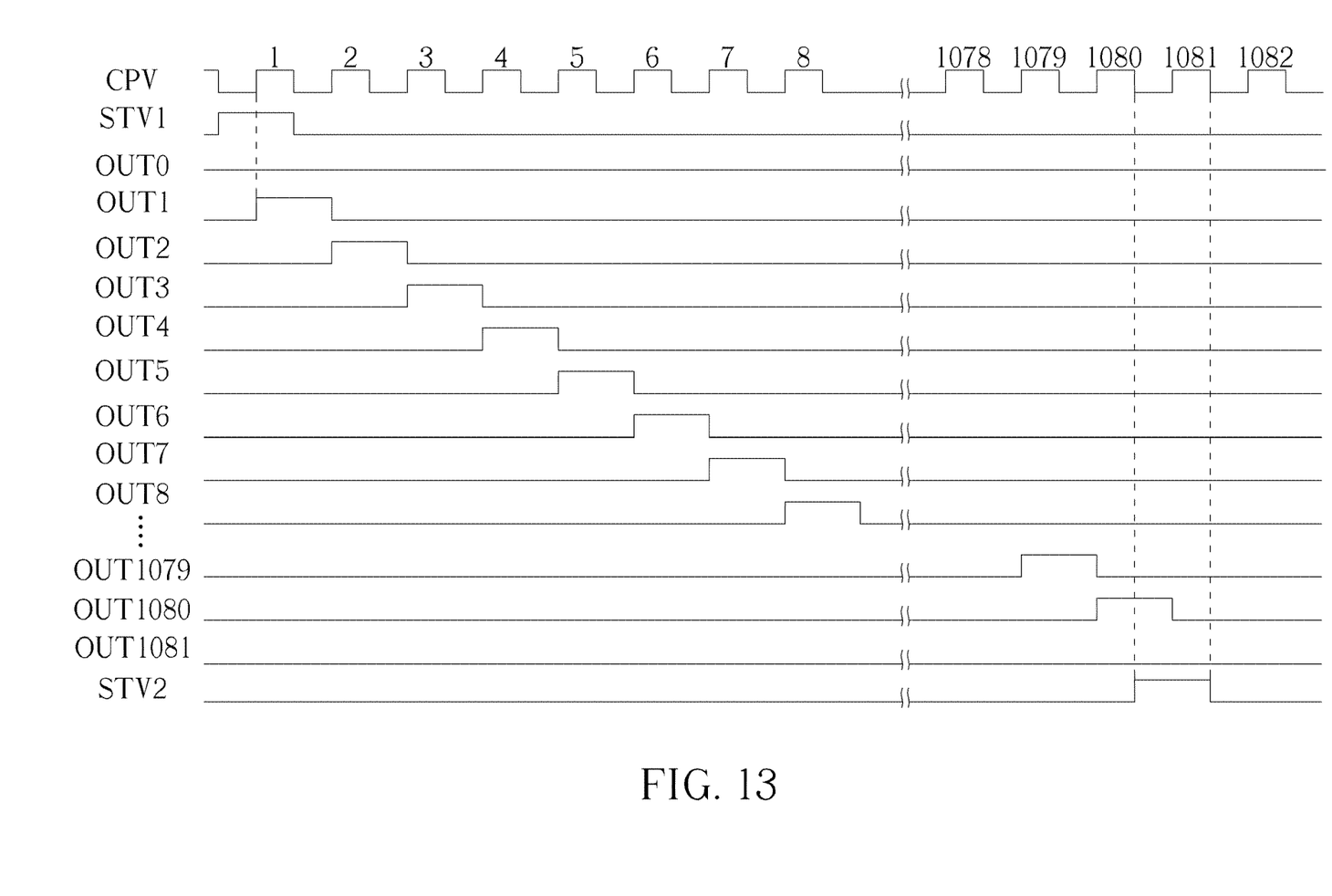
FIG. 13 is a signal diagram of gate control signals CPV, STV1, OUT0 to OUT1081, and STV2.

FIG. 13 is a signal diagram of the gate control signals CPV, STV1 and STV2, and turn-on signals OUT0 to OUT1081. When the first pulse of the gate scanning start signal STV1 is detected at the first rising edge (or within the first clock cycle) of the gate control signal CPV, the protection circuit 121 disables the gate scanning start signal STV1 to be kept at a low logic level. The gate driver 120 sequentially turns on the gate lines by outputting the turn-on signals OUT1 having a single pulse at the first clock cycle of the gate control signal CPV, the turn-on signals OUT2 having a single pulse at the second clock cycle of the gate control signal CPV, . . . , and the turn-on signals OUT1080 having a single pulse at the 1080th clock cycle of the gate control signal CPV. Given that there are 1080 gate lines in the display panel, the protection circuit 121 enables the gate scanning start signal STV2 to receive the first pulse of the gate scanning start signal STV2 for the vertical scanning operation of a new frame.

Figure 14:
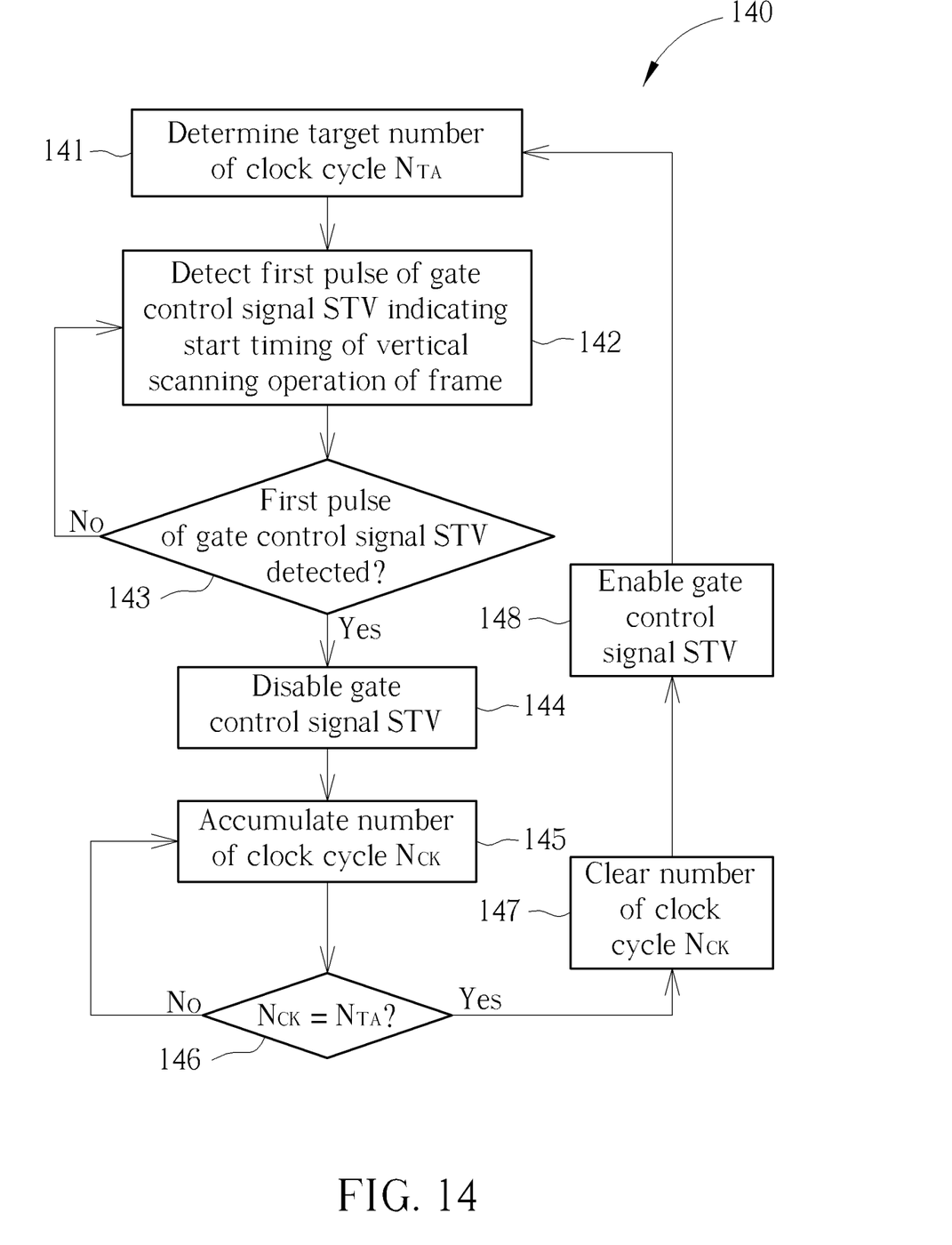
FIG. 14 is a flowchart of an operation control process according to an embodiment of the present invention.

FIG. 14 is a flowchart of an operation control process 140 according to an embodiment of the present invention. The operation control process 140 may be performed by the protection circuit 120, and includes the following steps.

Step 141: Determine a target number of clock cycles $N_{TA}$.

Step 142: Detect a pulse of gate scanning start signal STV indicating a start timing of vertical scanning operation of frame.

Step 143: Determine whether a first pulse of the gate scanning start signal STV has been detected? Go to Step 144 if yes; return to Step 142 if no.

Step 144: Disable the gate scanning start signal STV.

Step 145: Accumulate a number of clock cycles $N_{CK}$.

Step 146: Determine whether the number of clock cycles $N_{CK}$ is equal to the target number of clock cycles $N_{TA}$? Go to Step 147 if yes; return to Step 145 if no.

Step 147: Clear the number of clock cycles $N_{CK}$.

Step 148: Enable the gate scanning start signal STV. Return to Step 141.

In Step 141, the protection circuit 120 determines a target number of clock cycles $N_{TA}$ according to the gate mode signals MODE1 to MODE8. In Step 142, the protection circuit 120 detects a pulse of gate scanning start signal STV (e.g., STV1 or STV2) indicating a start timing of vertical scanning operation of frame. In Steps 143 to 144, the protection circuit 120 disables the gate scanning start signal STV when the first pulse of the gate scanning start signal STV has been detected. In Step 145, the protection circuit 120 accumulates the number of clock cycles $N_{CK}$. In Steps 146 to 147, the protection circuit 120 clears the number of clock cycles $N_{CK}$ when the number of clock cycles $N_{CK}$ is equal to the target number of clock cycles $N_{TA}$. In Step 148, the protection circuit 120 enables the gate scanning start signal STV for the next vertical scanning operation of a new frame. Therefore, the gate driver 13 is unable to start excessive vertical scanning operations within one frame scanning period, which protects the gate driver 13 from overload.

To sum up, the present invention provides a protection circuit and related operation control method to enable the PFM circuit when the operating duration of the PFM circuit is not greater than a first threshold, and disables the PFM circuit when a rest duration of the PFM circuit is not greater than a second threshold. The present invention further provides a protection circuit and related operation control method to avoid starting excessive vertical scanning operations within one frame scanning period by masking one of the gate scanning start signal STV, the gate clock signal CKV and the gate discharge signal OEV, which protects the power circuit and the gate driver from overload. The present invention further provides a protection circuit and related operation control method to disable the gate scanning start signal STV when the number of clock cycles is not equal to a target number of clock cycles, which protects the gate driver from overload.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power circuit for a display system, comprising:
   a first pulse frequency modulation (PFM) circuit, configured to convert a system power into a first intermediate voltage;
   a first charge pump coupled to the first PFM circuit, and configured to convert the first intermediate voltage into a first gate power;
   a second PFM circuit, configured to convert the system power into a second intermediate voltage;
   a second charge pump, coupled to the second PFM circuit, and configured to convert the second intermediate voltage into a second gate power; and
   a protection circuit, coupled to the first PFM circuit, the first charge pump, the second PFM circuit, and the second charge pump, and configured to enable the first PFM circuit and the second PFM circuit when an operating duration of the first PFM circuit and the second PFM circuit is not greater than a first threshold, and disables the first PFM circuit and the second PFM circuit when a rest duration of the first PFM circuit and the second PFM circuit is not greater than a second threshold.

2. The operation control method of claim 1, wherein the protection circuit detects an intermediate voltage generated by the PFM circuit to determine whether the PFM circuit enabled.

3. The operation control method of claim 1, wherein the protection circuit detects the gate power generated by the charge pump to determine whether an operating cycle of the power circuit has been completed; and clears the operating duration of the PFM circuit when the gate power generated by the charge pump is satisfied and the operating cycle of the power circuit has been completed.

4. The operation control method of claim 1, wherein the protection circuit clears the rest duration of the PFM circuit when the rest duration of the PFM circuit is greater than the second threshold.

5. An operation control method for a protection circuit configured to protect a power circuit of a display system, wherein the power circuit comprises a PFM (pulse frequency modulation) circuit, a charge pump and the protection circuit, comprising:
   enabling the PFM circuit;
   accumulating an operating duration of the PFM circuit when the PFM circuit enabled;
   determining whether the operating duration of the PFM circuit is greater than a first threshold when a gate power generated by the charge pump is not satisfied;
   disabling the PFM circuit when the operating duration of the PFM circuit is greater than the first threshold;
   accumulating a rest duration of the PFM circuit when the PFM circuit is disabled; and
   enabling the PFM circuit when the rest duration of the PFM circuit is greater than a second threshold.

6. The operation control method of claim 5, wherein after the step of enabling the PFM circuit comprises:
   detecting an intermediate voltage generated by the PFM circuit to determine whether the PFM circuit enabled.

7. The operation control method of claim 5, wherein after the step of accumulating the operating duration of the PFM circuit when the PFM circuit enabled comprises:
   detecting the gate power generated by the charge pump to determine whether an operating cycle of the power circuit has been completed; and
   clearing the operating duration of the PFM circuit when the gate power generated by the charge pump is satisfied and the operating cycle of the power circuit has been completed.

8. The operation control method of claim 5, wherein after the step of accumulating the rest duration of the PFM circuit when the PFM circuit is disabled comprises:
   clearing the rest duration of the PFM circuit when the rest duration of the PFM circuit is greater than the second threshold.

9. An operation control method for a protection circuit configured to protect a gate driver of a display system, comprising:
- detecting a pulse of a gate scanning start signal indicating a start timing of a vertical scanning operation of a frame;
- masking the gate control signal and accumulating a mask duration of the gate control signal after a first pulse of the gate control signal has been detected; and
- clearing the mask duration and detecting the pulse of the gate control signal when the mask duration is greater than a threshold.

10. The operation control method of claim 9, further comprising:
- after detecting the pulse of the gate scanning start signal indicating the start timing of vertical scanning operation of the frame, accumulating a mask duration of the gate scanning start signal after a first pulse of the gate scanning start signal has been detected;
- after clearing the mask duration and detecting the pulse of the gate control signal when the mask duration is greater than the threshold, determining whether another pulse of the gate scanning start signal is detected when the mask duration is not greater than the threshold; and
- disabling a gate control clock signal indicating a turn-on timing of a vertical scanning line when the another pulse of the gate scanning start signal is detected.

11. The operation control method of claim 9, further comprising:
- after detecting the pulse of the gate scanning start signal indicating the start timing of vertical scanning operation of the frame, accumulating a mask duration of the gate scanning start signal when a first pulse of the gate scanning start signal has been detected;
- after clearing the mask duration and detecting the pulse of the gate scanning start signal when the mask duration is greater than the threshold, determine whether another pulse of the gate scanning start signal is detected when the mask duration is not greater than the threshold; and
- disabling a gate control discharge signal indicating a discharge timing of a vertical scanning line.

12. A gate driver for a display system, comprising:
- an input buffer, configured to receive agate scanning start signal, a shift clock signal, a plurality of gate mode signals indicating a number of gate lines of a display panel of the display system;
- a bi-directional shift register coupled to the input buffer;
- a level shifter coupled to the bi-directional shift register;
- an output buffer coupled to the level shifter, and configured to generate a plurality of gate turn-on signals to the display panel according to the gate scanning start signal, the shift clock signal, and the plurality of mode signals; and
- a protection circuit coupled to the bi-directional shift register and the level shifter, and configured to disable the gate scanning start signal when a number of clock cycles of the shift clock signal is less than a target number after a first pulse of the gate scanning start signal has been detected, and enable the gate scanning start signal when the number of clock cycles of the shift clock signal is equal to the target number after the first pulse of the gate scanning start signal has been detected.

* * * * *